(12) United States Patent
Bradshaw et al.

(10) Patent No.: US 7,794,687 B2
(45) Date of Patent: Sep. 14, 2010

(54) ZIRCONIUM HYDROXIDE

(75) Inventors: Heather Bradshaw, Manchester (GB); Clive Butler, Manchester (GB); Hazel Stephenson, Manchester (GB)

(73) Assignee: Magnesium Elektron Limited, Salford Quays (GB)

( * ) Notice: Subject to any disclaimer, the term of this patent is extended or adjusted under 35 U.S.C. 154(b) by 0 days.

(21) Appl. No.: 12/278,074

(22) PCT Filed: Jan. 24, 2007

(86) PCT No.: PCT/GB2007/000209

§ 371 (c)(1),
(2), (4) Date: Aug. 25, 2008

(87) PCT Pub. No.: WO2007/088326

PCT Pub. Date: Aug. 9, 2007

(65) Prior Publication Data

US 2009/0005239 A1    Jan. 1, 2009

(30) Foreign Application Priority Data

Feb. 3, 2006  (GB)  ................... 0602217.2

(51) Int. Cl.
*C01G 25/02*    (2006.01)
(52) U.S. Cl. .................. 423/608; 423/594.12
(58) Field of Classification Search .............. 423/608, 423/594.12
See application file for complete search history.

(56) References Cited

U.S. PATENT DOCUMENTS

2003/0100447 A1* 5/2003 Deeba et al. ................ 502/339
2005/0175525 A1   8/2005 Fu et al.
2006/0245999 A1* 11/2006 Shen et al. .................. 423/608
2007/0122331 A1*  5/2007 Amirzadeh-Asl ........... 423/274
2008/0064908 A1*  3/2008 Fukuzawa ................... 585/269
2009/0305882 A1* 12/2009 Dahar et al. ................ 502/303

FOREIGN PATENT DOCUMENTS

| EP | 1 621 251 | 2/2006 |
|---|---|---|
| JP | 11-292538 | 10/1999 |
| JP | 2000-247641 | 9/2000 |
| WO | 03/037506 | 5/2003 |
| WO | 2004/007372 | 1/2004 |
| WO | 2004/096713 | 11/2004 |

OTHER PUBLICATIONS

International Search Report (PCT/GB2007/000209) dated May 8, 2007.

* cited by examiner

*Primary Examiner*—Timothy C Vanoy
*Assistant Examiner*—Michelle Hou
(74) *Attorney, Agent, or Firm*—Pearne & Gordon LLP

(57) ABSTRACT

This invention relates to an improved amorphous zirconium hydroxide and a method for its production. The hydroxide has a surface area of at least 300 $m^2/g$, a total pore volume of at least 0.70 $cm^3/g$ and an average pore size of between 5 nm and 15 nm, and is prepared by a process which comprises the steps of: a) preparing an aqueous solution comprising sulphate anions and a zirconium salt such that the $ZrO_2:SO_3$ ratio is 1:0.40 to 1:0.52, (b) chilling the solution to below 25° C., (c) adding an alkali in order to precipitate the amorphous zirconium hydroxide, (d) filtering and washing the precipitated zirconium hydroxide with water or an alkali to remove residual sulphate and chloride, (e) hydrothermally treating the zirconium hydroxide at a pressure of less than 3 barg, and (f) drying the zirconium hydroxide. The zirconium hydroxide of the present invention, which can be doped, is particularly useful in catalytic applications.

26 Claims, 2 Drawing Sheets

ZIRCONIUM HYDROXIDE

Figure 1:
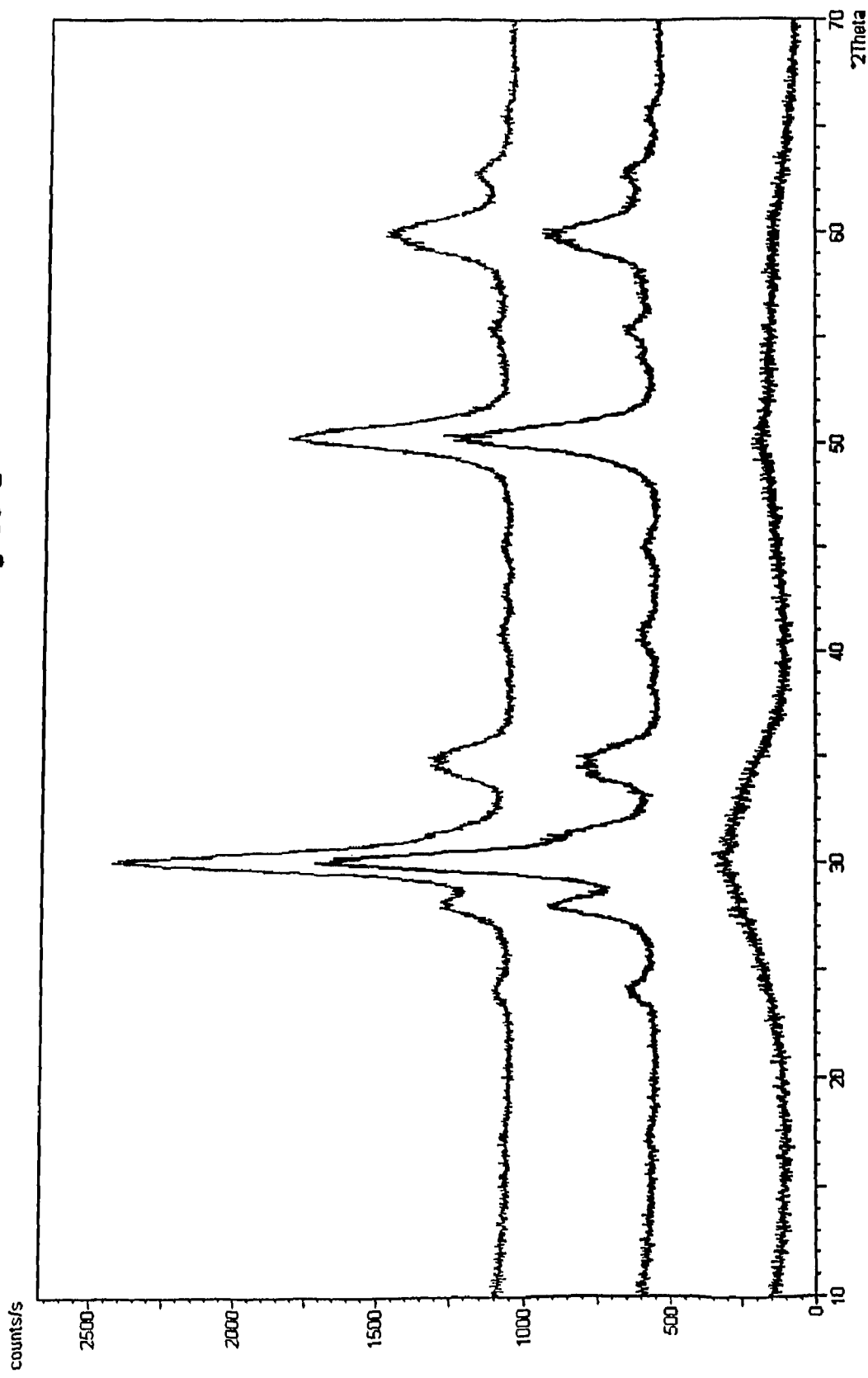

This invention relates to an improved amorphous zirconium hydroxide and a method for its production. The zirconium hydroxide may be doped or undoped. The term "zirconium hydroxide" is used in this patent application to refer to the various terms known in the art for this compound, such as hydrous zirconium oxide and hydrated zirconia. The zirconium hydroxide of the present invention is particularly useful in catalytic applications.

International patent application no. PCT/GB2004/001840, international publication number WO 2004/096713 A1, discloses a method for the production of zirconium oxides and zirconium-based mixed oxides. The process involves the precipitation of zirconium hydroxide from an aqueous solution of zirconium salt by reaction with an alkali in the presence of a controlled amount of sulphate anions at a temperature of not greater than 50° C. The hydroxide is then calcined to form an essentially sulphate free zirconium oxide.

Japanese patent application publication nos. 11-292538 and 2000-247641 describe the manufacture of zirconium hydroxide from a zirconium basic sulphate by the addition of base to a slurry of the sulphate. However, the processes set out in these patents do not result in zirconium hydroxide having the improved pore volume, pore size and surface area properties of the present invention.

It has been surprisingly found that by modifying the reactions conditions used to form the zirconium hydroxide precursor in the above international patent application an improved zirconium hydroxide can be produced. Specifically, the zirconium hydroxide of the present invention is amorphous and has a high surface area (typically 380-420 $m^2/g$), a large total pore volume (typically 0.78-1.18 $cm^3/g$) and a large pore size distribution.

On firing the beneficial total pore volume and pore size distribution characteristics of the material are not reduced to the same extent as has been found in prior art zirconium hydroxides. After calcination at 450° C. for 2 hours the total pore volume is typically 0.42-0.61 $cm^3/g$ with an average pore size 15-22 nm, and after calcination at 650° C. for 2 hours the total pore volume is typically 0.26-0.42 $cm^3/g$ and the average pore size is 25-34 nm.

In addition, the particle size distribution is such that the material can be formed into extrudates.

The process for producing the material of the present invention involves preparing an aqueous solution comprising sulphate anions and a zirconium salt. Preferably the sulphate anions are added as sulphuric acid. The $ZrO_2:SO_3$ ratio should be 1:0.40-1:0.52, preferably 1:0.45. The zirconium salt is preferably the oxychloride.

This solution is chilled to below 25° C. and an alkali is added in order to precipitate the amorphous zirconium hydroxide. Preferably the temperature of the solution is less than 10° C., more preferably less than 2° C. and most preferably −2° C. The alkali is preferably chilled in a refrigerator to below 25° C., the preferred alkali being sodium hydroxide.

In the preferred process, 10% sodium hydroxide is added over 2 hours until the solution reaches a pH greater than or equal to 6, followed by the addition of room temperature 28% sodium hydroxide until the solution reaches a pH greater than or equal to 11. Preferably the 10% sodium hydroxide is added over 2 hours until the solution reaches pH 8. Preferably the 28% sodium hydroxide is added until the solution reaches pH 13.

The precipitated zirconium hydroxide is then filtered and washed with water or an alkali to remove the residual sulphate and chloride. The wet cake is then preferably reslurried in water and the pH adjusted to between 4 and 9 with nitric acid, preferably 30% nitric acid, and the slurry is filtered and washed with water or an acid to remove residual sodium. It is most preferred that the washing and reslurrying are carried out with deionised water. Also, in the preferred process the pH is adjusted to 8.

The resulting wet cake is hydrothermally treated at a pressure of less than 3 barg and dried. The resulting zirconium hydroxide is essentially free of sodium, chloride and sulphate impurities. The preferred hydrothermal treatment conditions are 1 barg for 5 hours.

The process optionally includes a milling step after the hydrothermal treatment step, for example so that the product is an appropriate size for extrusion. The milling may be carried out either before or after the product is dried.

After it has been dried, the amorphous zirconium hydroxide of the present invention may be calcined. The preferred calcination conditions are 450° C. to 900° C. for between 1 and 24 hours, more preferably 450° C. to 750° C.

The process of the present invention allows the production of amorphous zirconium hydroxide having a surface area of at least 300 $m^2/g$, a total pore volume of at least 0.70 $cm^3/g$ and an average pore size of between 5 nm and 15 nm.

Furthermore, amorphous zirconium hydroxides may be formed that have a surface area of at least 80 $m^2/g$, a total pore volume of at least 0.35 $cm^3/g$ and an average pore size of between 10 nm and 30 nm after calcination at 450° C. for 2 hours.

In addition, the process of the present invention permits the formation of amorphous zirconium hydroxides that have a surface area of at least 30 $m^2/g$, a total pore volume of at least 0.20 $cm^3/g$ and an average pore size of between 20 nm and 40 nm after calcination at 650° C. for 2 hours.

It is also possible to produce amorphous zirconium hydroxides that have a surface area of at least 20 $m^2/g$, a total pore volume of at least 0.15 $cm^3/g$ and an average pore size of between 25 nm and 60 nm after calcination at 700° C. for 2 hours The zirconium hydroxide of the present invention may be doped with an alkaline earth oxide, a rare earth oxide, a first row transition metal oxide, silica, alumina, tin oxide or lead oxide, or a mixture thereof. The preferred dopant is silica, preferably in an amount of between 0.1% and 10% by weight.

The present invention will now be described by way of example with reference to the following Examples.

EXAMPLE 1

(JH15/04)—Comparative 85.41 g of 98 wt % aqueous sulphuric acid, 277.04 g deionised water and 970.87 g zirconium oxychloride (20.6 wt % $ZrO_2$) were mixed and cooled to 10° C. This resulted in a solution having a $ZrO_2:SO_3$ ratio of 0.53. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 1 barg for 5 hours and then dried.

EXAMPLE 2

(JH13/04)—Comparative 85.41 g of 98 wt % aqueous sulphuric acid, 277.04 g deionised water and 970.87 g zirconium oxychloride (20.6 wt % $ZrO_2$) were mixed and cooled to 2° C. This resulted in a solution having a $ZrO_2:SO_3$ ratio of 0.53. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 1 barg for 5 hours and then dried.

EXAMPLE 3

JH11/04

80.58 g of 98 wt % aqueous sulphuric acid, 281.88 g deionised water and 970.87 g zirconium oxychloride (20.6 wt % $ZrO_2$) were mixed and cooled to 2° C. This resulted in a solution having a $ZrO_2:SO_3$ ratio of 0.50. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 1 barg for 5 hours and then dried.

EXAMPLE 4

JH17/04

75.75 g of 98 wt % aqueous sulphuric acid, 231.95 g deionised water and 1025.64 g zirconium oxychloride (19.5 wt % $ZrO_2$) were mixed and cooled to 2° C. This resulted in a solution having a $ZrO_2:SO_3$ ratio of 0.47. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 1 barg for 5 hours and then dried.

EXAMPLE 5

JR18/04

80.58 g of 98 wt % aqueous sulphuric acid, 227.11 g deionised water and 1025.64 g zirconium oxychloride (19.5 wt % $ZrO_2$) were mixed and cooled to 6° C. This resulted in a solution having a $ZrO_2:SO_3$ ratio of 0.50. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 1 barg for 5 hours and then dried.

EXAMPLE 6

JH23/04

72.52 g of 98 wt % aqueous sulphuric acid, 245.58 g deionised water and 1015.23 g zirconium oxychloride (19.7 wt % $ZrO_2$) were mixed and cooled to −2° C. This resulted in a solution having a $ZrO_2:SO_3$ ratio of 0.45. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 1 barg for 5 hours and then dried.

EXAMPLE 7

JH46/04

67.69 g of 98 wt % aqueous sulphuric acid, 250.42 g deionised water and 1015.23 g zirconium oxychloride (19.7 wt % $ZrO_2$) were mixed and cooled to −2° C. This resulted in a solution having a $ZrO_2:SO_3$ ratio of 0.42. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 1 barg for 5 hours and then dried.

EXAMPLE 8

JH47/04

64.46 g of 98 wt % aqueous sulphuric acid, 253.64 g deionised water and 1015.23 g zirconium oxychloride (19.7 wt % $ZrO_2$) were mixed and cooled to −2° C. This resulted in a solution having a $ZrO_2:SO_3$ ratio of 0.40. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 1 barg for 5 hours and then dried.

EXAMPLE 9

(PH02/41)—Comparative 102.56 g of 77 wt % aqueous sulphuric acid, 259.90 g deionised water and 970.87 g zirconium oxychloride (20.6 wt $ZrO_2$) were mixed and cooled to 1.5° C. This resulted in a solution having a $ZrO_2:SO_3$ ratio of 0.50. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. The wet cake was then hydrothermally treated at 3 barg for 5 hours and then dried.

This comparative example shows that the use of high pressures during the hydrothermal treatment step impairs the surface area, total pore volume, pore size and phase properties of the resulting material.

The surface area (SA), total pore volume (TPV) and pore size (PS) values for Examples 1 to 9 are shown in Table 1 (xln=crystalline).

It has been observed that the hydrothermal treatment of zirconium hydroxide improves its surface area, total pore volume and pore size values. The additional Examples shown below were carried out in order to investigate the optimum hydrothermal conditions.

EXAMPLE 10

(JH74b/05)—Comparative 217.57 g of 98 wt % aqueous sulphuric acid, 705.51 g deionised water and 3076.92 g zirconium oxychloride (19.5 wt % $ZrO_2$) were mixed and cooled to −2° C. This resulted in a solution having a $ZrO_2:SO_3$ ratio of 0.45. 10 wt % aqueous sodium hydroxide that had been chilled in a refrigerator was added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. One third of this wet cake was then hydrothermally treated at 5 barg for 5 hours and then dried.

EXAMPLE 11

(JR74c/05)—Comparative

One third of the wet cake produced in Example 10 (JH 74b/04) was hydrothermally treated at 8.5 barg for 5 hours and then dried.

EXAMPLE 12

(JH05g/04)—Comparative 6153.4 g of 77 wt % aqueous sulphuric acid, 15594.18 g deionised water and 58252.43 g zirconium oxychloride (20.6 wt % $ZrO_2$) were mixed and cooled to +2° C. This resulted in a solution having a $ZrO_2:SO_3$ ratio of 0.50. 10 wt % aqueous sodium hydroxide that had been chilled in a refrigerator was

TABLE 1

| Sample ID | SA ($m^2$/g) | TPV ($cm^3$/g) | PS (nm) | Phase | SA 450° C./ 2 hrs ($m^2$/g) | TPV 450° C./ 4 hrs ($cm^3$/g) | PS 450° C./ 2 hrs (nm) | SA 650° C./ 2 hrs ($m^2$/g) | TPV 650° C./ 4 hrs ($cm^3$/g) | PS 650° C./ 2 hrs (nm) | SA 700° C./ 2 hrs ($m^2$/g) | TPV 700° C./ 4 hrs ($cm^3$/g) | PS 700° C./ 2 hrs (nm) |
|---|---|---|---|---|---|---|---|---|---|---|---|---|---|
| Example 1 (JH15/04) | 429 | 0.69 | 6 | amorphous | 109 | 0.35 | 13 | | | | 28 | 0.21 | 30 |
| Example 2 (JH13/04) | 422 | 0.65 | 6 | amorphous | 123 | 0.35 | 11 | | | | 32 | 0.21 | 26 |
| Example 3 (JH11/04) | 405 | 0.82 | 8 | amorphous | 113 | 0.41 | 14 | | | | 32 | 0.23 | 29 |
| Example 4 (JH17/04) | 398 | 1.05 | 11 | amorphous | 112 | 0.57 | 20 | | | | 35 | 0.33 | 38 |
| Example 5 (JH18/04) | 407 | 0.78 | 8 | amorphous | 113 | 0.36 | 13 | | | | 29 | 0.18 | 25 |
| Example 6 (JH23/04) | 413 | 1.18 | 11 | amorphous | 127 | 0.61 | 19 | 52 | 0.42 | 32 | 39 | 0.40 | 41 |
| Example 7 (JH46/04) | 392 | 0.93 | 9 | amorphous | 118 | 0.53 | 18 | 51 | 0.37 | 29 | 40 | 0.31 | 31 |
| Example 8 (JH47/04) | 394 | 0.89 | 9 | amorphous | 123 | 0.51 | 17 | 51 | 0.37 | 29 | 41 | 0.32 | 31 |
| Example 9 (PH02/41) | 207 | 0.27 | 5 | slightly xln | 94 | 0.21 | 9 | | | | | | | added dropwise until the solution reached pH 8. Room temperature 28 wt % aqueous sodium hydroxide was then added until the solution reached pH 13.

The resulting precipitated zirconium hydroxide was then filtered and washed with deionised water to remove residual sulphate and chloride ions. The wet cake was then reslurried in deionised water and the pH adjusted to 8 with 30 wt % aqueous nitric acid. The resulting slurry was then filtered and washed with deionised water to remove residual sodium. 1307.2 g of the sample (equivalent to 200 g $ZrO_2$) was then dried without being hydrothermally treated.

EXAMPLE 13

JH05k/04

1307.2 g of the wet cake produced in example 12 (JH05 g/04) was hydrothermally treated at 1 barg for 9 hours and then dried.

The surface area (SA), total pore volume (TPV) and pore size (PS) values for Examples 10 to 14, along with those for Example 6 for comparison, are shown in Table 2.

TABLE 2

| Sample ID | SA (m²/g) | TPV (cm³/g) | PS (nm) | Phase | SA 450° C./ 2 hrs (m²/g) | TPV 450° C./ 4 hrs (cm³/g) | PS 450° C./ 2 hrs (nm) | SA 650° C./ 2 hrs (m²/g) | TPV 650° C./ 4 hrs (cm³/g) | PS 650° C./ 2 hrs (nm) | SA 700° C./ 2 hrs (m²/g) | TPV 700° C./ 4 hrs (cm³/g) | PS 700° C./ 2 hrs (nm) |
|---|---|---|---|---|---|---|---|---|---|---|---|---|---|
| Example 10 (JH74b/05) | | | | slightly xln | 119 | 0.24 | 8 | 35 | 0.17 | 19 | 27 | 0.15 | 22 |
| Example 11 (JH74c/05) | | | | slightly xln | 118 | 0.24 | 8 | 38 | 0.16 | 17 | 28 | 0.14 | 20 |
| Example 12 (JH05g/04) | 343 | 0.49 | 6 | amorphous | 114 | 0.35 | 12 | | | | 39 | 0.26 | 27 |
| Example 13 (JH05k/04) | 377 | 0.77 | 8 | amorphous | 114 | 0.44 | 15 | | | | 39 | 0.32 | 33 |
| Example 6 (JH23/04) | 413 | 1.18 | 11 | amorphous | 127 | 0.61 | 19 | 52 | 0.42 | 32 | 39 | 0.40 | 41 |

FIG. 1 shows XRD traces for Example 11 (top), Example 10 (middle) and Example 6 (bottom). The traces for Examples 11 and 10 show that these samples are slightly crystalline, whereas the absence of any sharp peaks in the trace for Example 6, particularly in the region 20-40 °2Theta, shows that this sample is amorphous.

Figure 2:
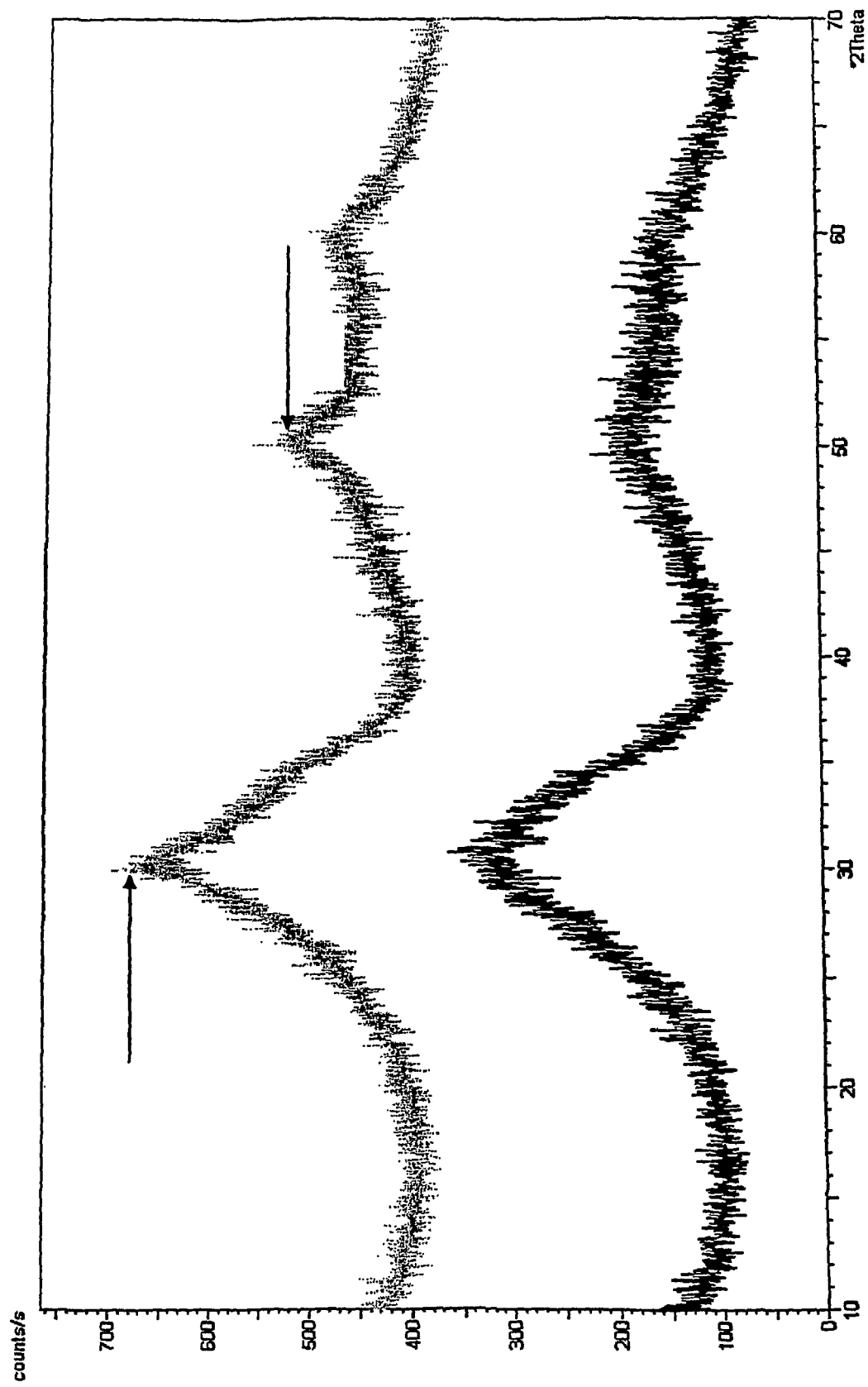

By way of illustration, FIG. 2 shows a close up of a typical XRD trace for an amorphous sample of zirconium hydroxide produced by the present process (bottom). The top trace is a close up of a slightly crystalline sample of zirconium hydroxide, the arrows indicating where the sharp peaks are beginning to appear against the broad amorphous background.

The invention claimed is:

1. An amorphous zirconium hydroxide having a surface area of at least 300 m²/g, a total pore volume of at least 0.70 cm³/g and an average pore size of between 5 nm and 15 nm.

2. An amorphous zirconium hydroxide as claimed in claim 1 which when calcined at 450° C. for 2 hours has a surface area of at least 80 m²/g, a total pore volume of at least 0.35 cm³/g and an average pore size of between 10 nm and 30 nm.

3. An amorphous zirconium hydroxide as claimed in claim 1 which when calcined at 650° C. for 2 hours has a surface area of at least 30 m²/g, a total pore volume of at least 0.20 cm³/g and an average pore size of between 20 nm and 40 nm.

4. An amorphous zirconium hydroxide as claimed in claim 1 which when calcined at 700° C. for 2 hours has a surface area of at least 20 m²/g, a total pore volume of at least 0.15 cm³/g and an average pore size of between 25 nm and 60 nm.

5. An amorphous zirconium hydroxide as claimed in claim 1 doped with an alkaline earth oxide, a rare earth oxide, a first row transition metal oxide, silica, alumina, tin oxide or lead oxide, or a mixture thereof.

6. An amorphous zirconium hydroxide as claimed in claim 5 doped with silica in an amount of from 0.1% to 10% by weight.

7. A process for preparing said amorphous zirconium hydroxide of claim 1 which comprises the steps of:
   (a) preparing an aqueous solution comprising sulfate anions and a zirconium salt such that the $ZrO_2$:$SO_3$ ratio is 1:0.40 to 1:0.52,
   (b) chilling the solution to below 25° C.,
   (c) adding an alkali in order to precipitate the amorphous zirconium hydroxide,
   (d) filtering and washing the precipitated zirconium hydroxide with water or an alkali to remove residual sulfate and chloride,
   (e) hydrothermally treating the zirconium hydroxide at a pressure of less than 3 barg, and
   (f) drying the zirconium hydroxide.

8. A process as claimed in claim 7, wherein the sulfate anions are added as sulfuric acid.

9. A process as claimed in claim 7, wherein the $ZrO_2$:$SO_3$ ratio is 1:0.45.

10. A process as claimed in claim 7, wherein the zirconium salt is zirconium oxychloride.

11. A process as claimed in claim 7, wherein the solution is chilled to less than 10° C.

12. A process as claimed in claim 11, wherein the solution is chilled to less than 2° C.

13. A process as claimed in claim 12, wherein the solution is chilled to −2° C.

14. A process as claimed in claim 7, wherein the alkali is chilled to less than 25° C.

15. A process as claimed in claim 7, wherein the alkali is sodium hydroxide.

16. A process as claimed in claim 15, wherein 10% sodium hydroxide is added over 2 hours until the solution reaches a pH greater than or equal to 6, followed by the addition of room temperature 28% sodium hydroxide until the solution reaches a pH greater than or equal to 11.

17. A process as claimed in claim 16, wherein the 10% sodium hydroxide is added over 2 hours until the solution reaches pH 8.

18. A process as claimed in claim 16, wherein the room temperature 28% sodium hydroxide is added until the solution reaches pH 13.

19. A process as claimed in claim 7, wherein the hydrothermal treatment is carried out at 1 barg for 5 hours.

20. A process as claimed in claim 7 additionally comprising after step (d) and before step (e) the steps of:
   (i) reslurrying the washed precipitate in water and adjusting the pH to between 4 and 9 with nitric acid, and
   (ii) filtering and washing the slurry with water or an acid to remove residual sodium.

21. A process as claimed in claim 20, wherein the pH is adjusted to pH 8 in step (i).

22. A process as claimed in claim 20, wherein the washing and reslurrying are carried out with deionized water.

23. A process as claimed in claim 7, wherein the amorphous zirconium hydroxide is milled.

24. A process for forming a zirconia comprising preparing an amorphous zirconium hydroxide in accordance with a process as claimed in claim 7, wherein the process additionally comprises the step of calcining the amorphous zirconium hydroxide after step (f).

25. A process as claimed in claim 24, wherein the amorphous zirconium hydroxide is calcined at 450° C. to 900° C. for between 1 and 24 hours.

26. A process as claimed in claim 25, wherein the amorphous zirconium hydroxide is calcined at 450° C. to 750° C.

* * * * *